United States Patent
Cetinkunt et al.

(10) Patent No.: US 7,201,096 B2
(45) Date of Patent: Apr. 10, 2007

(54) LINEAR MOTOR HAVING A MAGNETICALLY BIASED NEUTRAL POSITION

(75) Inventors: Sabri Cetinkunt, Oak Park, IL (US); Aleksandar M. Egelja, Naperville, IL (US); Mikhail A. Sorokine, Naperville, IL (US)

(73) Assignee: Caterpillar Inc, Peoria, IL (US)

( * ) Notice: Subject to any disclaimer, the term of this patent is extended or adjusted under 35 U.S.C. 154(b) by 1 day.

(21) Appl. No.: 11/144,713

(22) Filed: Jun. 6, 2005

(65) Prior Publication Data
US 2006/0272494 A1 Dec. 7, 2006

(51) Int. Cl.
*F15B 13/044* (2006.01)
*F15B 13/043* (2006.01)
*H01F 7/08* (2006.01)

(52) U.S. Cl. .................. 91/459; 137/625.64; 335/220

(58) Field of Classification Search ............... 91/459; 137/625.64; 335/220
See application file for complete search history.

(56) References Cited

U.S. PATENT DOCUMENTS

| | | | |
|---|---|---|---|
| 2,702,841 A * | 2/1955 | Bernstein | 335/179 |
| 4,363,980 A * | 12/1982 | Petersen | 310/15 |
| 4,593,719 A | 6/1986 | Leonard | |
| 4,605,197 A | 8/1986 | Casey et al. | |
| 4,612,845 A * | 9/1986 | Burkel et al. | 91/459 |
| 4,870,306 A * | 9/1989 | Petersen | 310/12 |
| 4,987,927 A | 1/1991 | Kluczynski | |
| 5,249,603 A | 10/1993 | Byers, Jr. | |
| 5,264,813 A | 11/1993 | Byers, Jr. | |
| 5,434,549 A * | 7/1995 | Hirabayashi et al. | 335/229 |
| 5,605,178 A | 2/1997 | Jennins | |
| 5,722,460 A | 3/1998 | Olsen et al. | |
| 5,732,678 A | 3/1998 | Lindquist et al. | |
| 5,787,915 A * | 8/1998 | Byers et al. | 137/625.65 |
| 5,921,279 A | 7/1999 | Barber | |
| 6,040,752 A * | 3/2000 | Fisher | 335/229 |
| 6,105,616 A | 8/2000 | Sturman et al. | |
| 6,334,604 B1 | 1/2002 | Roth | |
| 6,473,928 B1 * | 11/2002 | Veloskey et al. | 137/624.14 |
| 6,501,357 B2 * | 12/2002 | Petro | 335/229 |
| 6,526,864 B2 | 3/2003 | Lindler et al. | |
| 6,615,868 B2 | 9/2003 | Ueki | |
| 2002/0008601 A1 | 1/2002 | Hisashi et al. | |

FOREIGN PATENT DOCUMENTS

EP 774 091 5/1997

(Continued)

OTHER PUBLICATIONS

English language abstract of JP 9-133106 dated May 20, 1997.

(Continued)

*Primary Examiner*—Thomas E. Lazo
(74) *Attorney, Agent, or Firm*—Finnegan, Henderson, Farabow, Garrett & Dunner

(57) ABSTRACT

A linear motor is provided including a stator having at least one electromagnetic coil and a rotor having at least one permanent magnet. The rotor is movable toward at least a first position when least one electromagnetic coil is energized and solely magnetically biased to a neutral position when the at least one electromagnetic coil is de-energized.

33 Claims, 4 Drawing Sheets

FOREIGN PATENT DOCUMENTS

| EP | 1045116 | 10/2000 |
|---|---|---|
| EP | 1 340 887 A2 | 9/2003 |
| EP | 1 429 035 A2 | 6/2004 |
| GB | 1 324 456 | 7/1973 |
| JP | 9-133106 | 5/1997 |
| JP | 9-133107 | 5/1997 |
| JP | 10-103304 | 4/1998 |
| WO | WO 94/05939 | 3/1994 |
| WO | WO 2005/086326 | 9/2005 |

OTHER PUBLICATIONS

English language abstract of JP 9-133107 dated May 20, 1997.
English language abstract of 10-103304 dated Apr. 21, 1998.
Reitz, V., editor, "Dissecting high-performance electrohydraulic valves", Machine Design, Apr. 2001.
Schneider, R.T., editor, "The hazy line between servo and proportional valves", Hydraulics & Penumatics, pp. 34-35, Dec. 2001.
D'Amore, M., "Linear-force motors enhance proportional valves", Hydraulics & Pneumatics, pp. 14, 16, Jul. 1998.
Jones, J.C., "Developments in Design of Electrohydraulic Control Valves From Their Initial Design Concept to Present Day Design and Applications", pp. 1-19, Workshop on Proportional and Servovalves, Monash University, Melbourne, Australia, Nov. 1997.
Kenjo, T., "Electronic Motors and Their Controls", Oxford Science Publications, 1991.
Moog, W.C., "Electrohydraulic Valves . . . A Technical Look", Moog, no date.
Moog, W.C., "D633 and D634 Series Direct Drive Servo-Proportional Control Valves with Integrated 24 V Electronics ISO 4401 Size 03 and 05", MOOG, no date.
Moog, W.C., "D634-P Series Direct Drive Proportional Valve with Integrated 24 V Electronics ISO 4401 Size 05", MOOG, no date.
MOOG, W.C., "Servovalves and Servo-Proportional Valves Product Line Overview", MOOG, no date.
Patent Abstracts of JA vol. 1999 #3 of Mar. 31, 1999 & JP 10 329926 of Dec. 15, 1998 Sumitomo Special Metals Co., Ltd.
Patent Abstracts of JA vol. 2000 #12 of Jan. 3, 2001 & JP 2000 253640 of Sep. 14, 2000 Sanyo Electric Co., Ltd.

\* cited by examiner

LINEAR MOTOR HAVING A MAGNETICALLY BIASED NEUTRAL POSITION

TECHNICAL FIELD

The present disclosure relates generally to a linear motor, and more particularly, to a linear motor having a magnetically biased neutral position.

BACKGROUND

Hydraulic systems often include operator controllable fluid actuators such as, for example, hydraulic cylinders. These hydraulic systems may include one or more valves having movable valve elements fluidly connected between a pump and the fluid actuator to control a flow rate and/or direction of pressurized fluid to and from chambers of the hydraulic cylinder. These valves may embody, for example, direct drive valves having a linear motor.

Linear motors typically include a rotor rectilinearly movable relative to a stator. The rotor may be connected to a valve element to affect movement thereof relative to a valve housing. The rotor may include a magnetically permeable armature that is biased by magnetic fluxes generated by the stator. The stator may include an electromagnetic coil and a permanent magnet surrounding the armature. An electromagnetic flux is generated when the electromagnetic coil is energized and, as a result, the electromagnetic flux biases the magnetically permeable armature to either a forward stroke position or a rearward stroke position depending upon the polarity of the electromagnetic flux. Linear motors also typically include a mechanical spring to bias the armature to a predetermined position when the electromagnetic coil of the stator is de-energized.

One such linear motor direct drive valve is disclosed in U.S. Pat. No. 5,787,915 ("the '915 patent"), issued to Byers et al. on Mar. 31, 1998. The '915 patent describes a direct drive valve unit having a linear motor and a valve. The linear motor includes a rectilinearly movable armature biased by a spring and surrounded by an annular permanent magnet and two annular electromagnetic coils. The valve includes a valve element supported in a bore formed within a valve housing. The valve element is directly connected to the armature for movement therewith. The spring mechanically biases the armature to a central position relative to the electromagnetic coils and, in turn, biases the valve element to a central position relative to the valve housing. When the electromagnetic coils are de-energized, the armature and valve will remain in the respective central positions as biased by the spring. When the electromagnetic coils are energized by supplying current thereto, the armature overcomes the spring bias and moves between a forward position and a rearward position.

Although the direct drive valve of the '915 patent may include a linear motor to directly move the valve element, the efficiency of the linear motor may be reduced because the force of the spring bias must be overcome during movement of the valve element in at least one of the forward and rearward positions. Additionally, the spring may increase the occurrence of hydraulic system malfunctions and/or contamination because wear and/or failure of the spring may cause fragments of the spring to wash downstream into other hydraulic system components or may cause the valve element to return to a position other than the central position when the electromagnetic coils are de-energized. Furthermore, the additional spring component may add to the complexity and cost of the direct drive valve.

The disclosed linear motor is directed to overcoming one or more of the problems set forth above.

SUMMARY OF THE INVENTION

In one aspect, the present disclosure is directed to a linear motor including a stator having at least one electromagnetic coil and a rotor having at least one permanent magnet. The rotor is movable toward at least a first position when the least one electromagnetic coil is energized and solely magnetically biased to a neutral position when the at least one electromagnetic coil is de-energized.

In another aspect, the present invention is directed to a method of operating a valve element. The method includes energizing at least one electromagnetic coil to move the valve element toward a first position, de-energizing the at least one electromagnetic coil, and solely magnetically biasing the valve element toward a neutral position.

DETAILED DESCRIPTION

Figure 1:
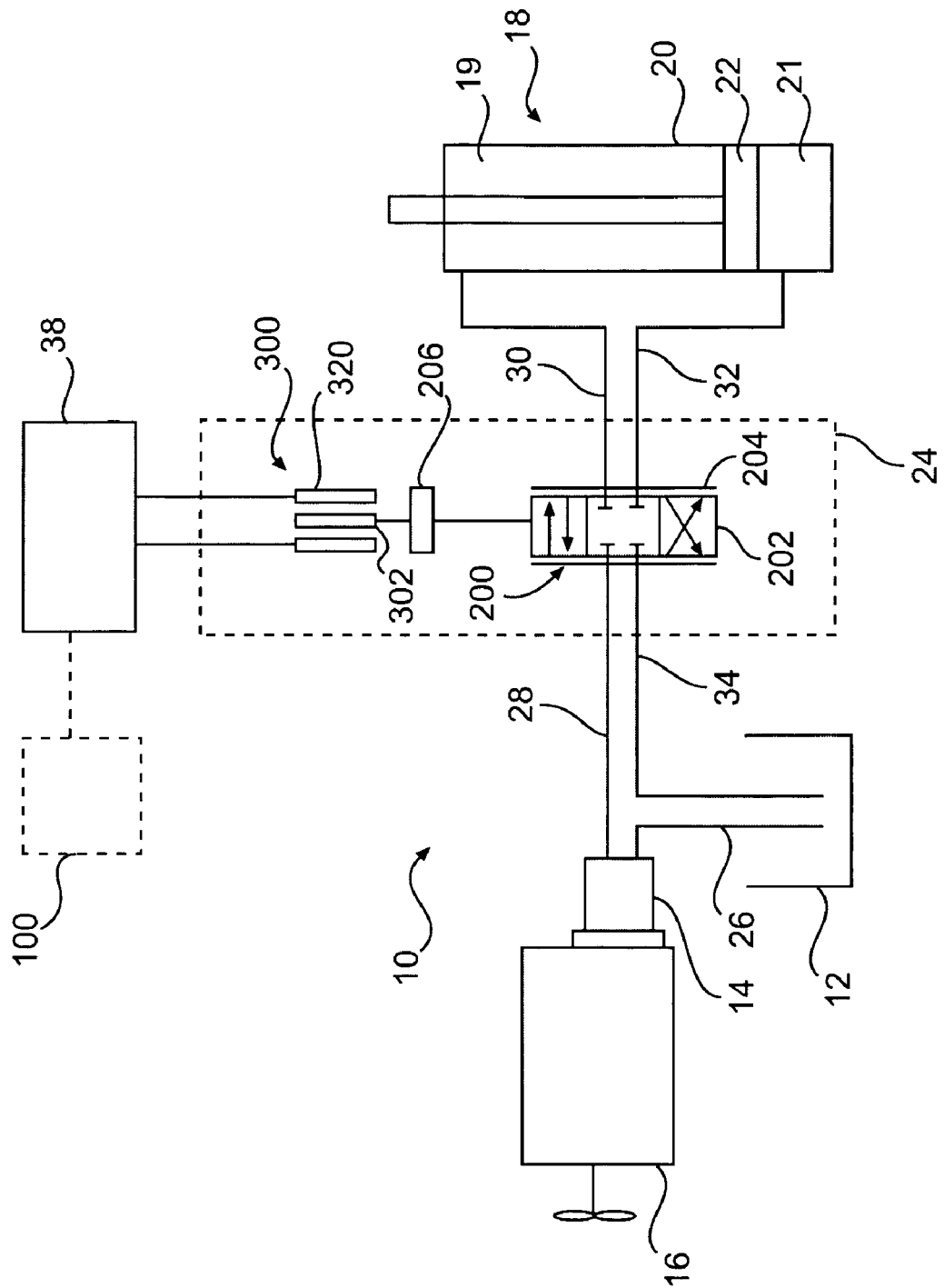
FIG. 1 is a schematic illustration of a disclosed hydraulic system according to an exemplary disclosed embodiment.

FIG. 1 illustrates an exemplary hydraulic system 10 that may selectively affect the flow and/or pressure of a fluid to produce a mechanical output. Hydraulic system 10 may include a tank 12, a source 14 of pressurized fluid, a power source 16, a fluid actuator 18, and a valve unit 24. Hydraulic system 10 may also include a passageway 26 fluidly connecting tank 12 with source 14, a passageway 28 fluidly connecting source 14 with valve unit 24, a passageway 30 fluidly connecting valve unit 24 with fluid actuator 18, a passageway 32 fluidly connecting fluid actuator 18 with valve unit 24, and a passageway 34 fluidly connecting valve unit 24 with tank 12. It is contemplated that hydraulic system 22 may include additional and/or different components such as, for example, a pressure sensor, a temperature sensor, a check valve, a pressure relief valve, an accumulator, and/or other components known in the art.

Tank 12 may constitute a reservoir configured to hold a supply of fluid. The fluid may include, for example, dedicated hydraulic oil, engine lubrication oil, transmission lubrication oil, or any other working fluid known in the art. One or more hydraulic systems may draw fluid from and return fluid to tank 12. It is contemplated that hydraulic system 10 may be connected to multiple separate fluid tanks.

Source 14 may be configured to produce a flow of pressurized fluid and may include a pump such as, for example, a variable displacement pump, a fixed displacement pump, or any other source of pressurized fluid known in the art. Source 14 may be drivably connected to power source 16 by, for example, a countershaft (not shown), a belt (not shown), an electrical circuit (not shown), or in any other suitable manner. Source 14 may be dedicated to supplying pressurized fluid only to hydraulic system 10, or alternately may supply pressurized fluid to additional hydraulic systems (not shown).

Power source 16 may be configured to produce a power output to drive source 14. Power source 16 may include an internal combustion engine, an electric motor, fluid motor, or any other power source known in the art. Power source 16 may be a power source of a work machine (not shown) supplying power to source 14 and to additional components (not shown) and/or a dedicated power source supplying power only to source 14.

Fluid actuator 18 may include a hydraulic cylinder. For example fluid actuator 18 may include a tube 20 and a piston assembly 22 disposed within tube 20. Fluid actuator 18 may include a first chamber 19 and a second chamber 21 separated by piston assembly 22. First and second chambers 19, 21 may be selectively fluidly connected with source 14 to supply pressurized fluid from source 14 to first and second chambers 19, 21 and may be selectively fluidly connected with tank 12 to drain pressurized fluid to tank 12 from first and second chambers 19, 21. It is contemplated that fluid actuator 18 may alternatively include a hydraulic motor and/or embody multiple fluid actuators.

Valve unit 24 may be disposed between source 14 and fluid actuator 18 and configured to selectively regulate a flow of pressurized fluid to and from fluid actuator 18. Valve unit 24 may include a valve 200 connected to a linear motor 300 by a mechanical joint 206, such as, for example an universal joint. It is contemplated that valve 200 may be connected to linear motor 300 by any suitable connection known in the art including, for example, a flexible coupling, a welded coupling, or a threaded coupling.

Valve 200 may include a three position valve element 202 supported in a valve bore 204. Valve element 202 may be configured to move between a first position at which pressurized fluid is allowed to flow to first chamber 19 and pressurized fluid is allowed to flow from second chamber 21, a second position at which pressurized fluid is allowed to flow from first chamber 19 and pressurized fluid is allowed to flow to second chamber 21, and a third position at which pressurized fluid is blocked from flowing to and from both first and second chambers 19, 21. It is contemplated that valve 200 may alternatively embody other types of valve elements such as, for example, a proportional valve element, a two-position valve element, or any other valve element known in the art.

Linear motor 300 may be configured to move valve element 202 and may include a rotor 302 and a stator 320. Rotor 302 may be elongate in shape and may be connected to valve element 202 via mechanical joint 206. Stator 320 may be substantially planar and may be disposed adjacent rotor 302. Stator 320 may generate magnetic fluxes to move rotor 302 and to correspondingly move valve element 202 between its first, second, and third positions. Stator 320 may be connected to a current source 38, such as, for example, a battery or a generator, and stator 320 may produce electromagnetic fluxes in response to a current supplied thereto. It is contemplated that rotor 302 and stator 320 may be any suitable shape, including, for example, rectilinear or cylindrical. It is also contemplated that linear motor 300 may include various other components such as a position sensor, a current amplifier, and other components known in the art. It is further contemplated that linear motor 300 may be controlled by a control system 100 as will be discussed below.

Figure 2:
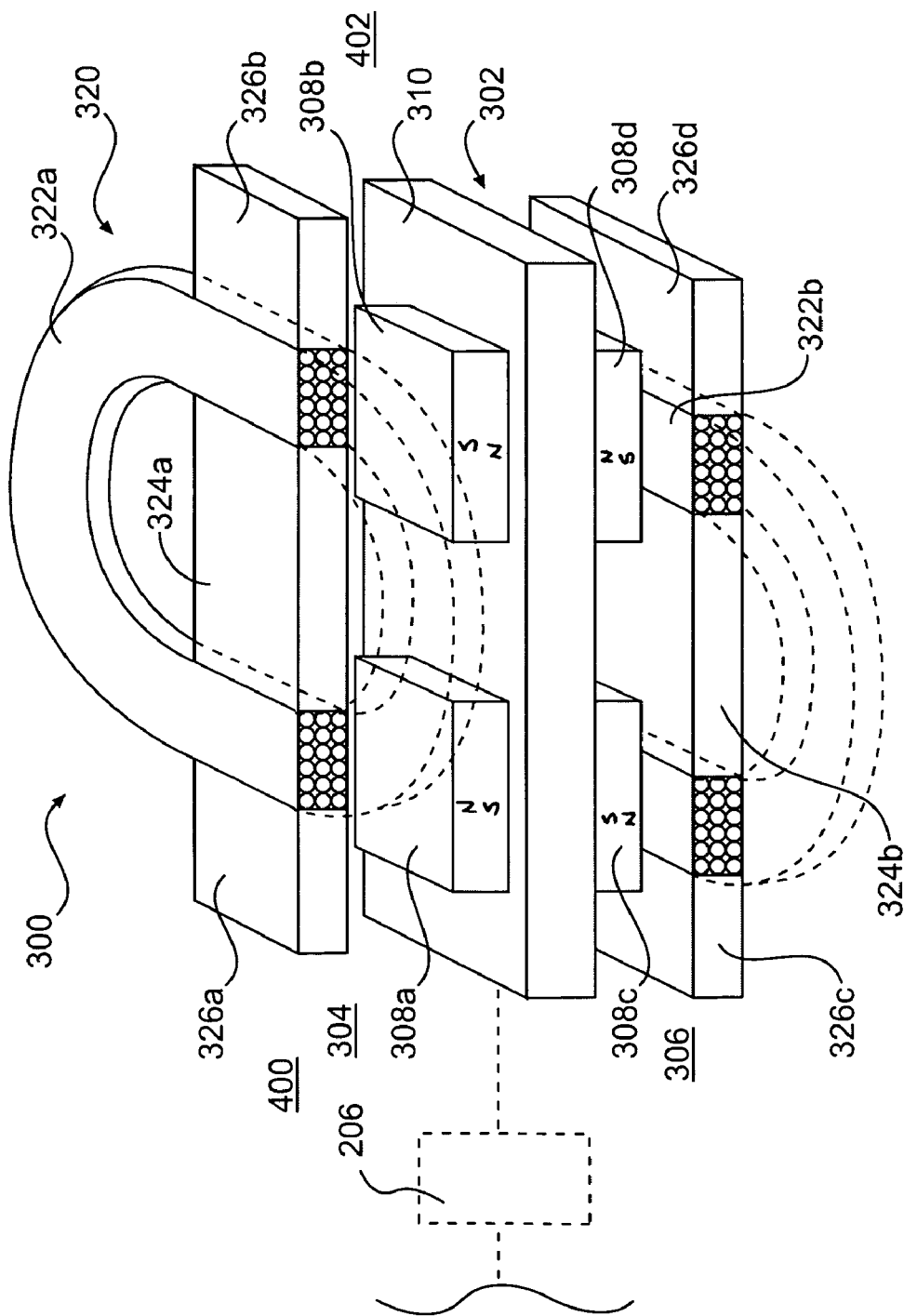
FIG. 2 is an exemplary linear motor for a valve unit of the hydraulic system illustrated in FIG. 1.

Referring to FIG. 2, rotor 302 may be configured to move relative to stator 320 and may include rotor magnets 308a–d and a rotor element 310. Rotor magnets 308a–d may be disposed on first and second sides 304, 306 of rotor member 310 and may be configured to move rotor element 310 when interacting with magnetic fluxes generated by electromagnetic coils 322a–b and/or with magnetic permeable elements 324a–b. It is contemplated that rotor magnets 308a–d may constitute a suitable permanent magnet and that rotor member 310 may be made from a suitable material having high magnetic permeability including, for example, steel 1010 or steel 1018.

First and second rotor magnets 308a–b may be disposed and spaced apart on first side 304 of rotor member 310. Similarly, third and fourth rotor magnets 308c–d may be disposed and spaced apart on second side 306 of rotor member 310. Rotor magnets 308a–d may interact with and may be attracted and/or repelled by magnetic fluxes generated by electromagnetic coils 322a–b. Rotor magnets 308a–b may also interact with and may be attracted toward magnetic permeable elements 324a–b. Attraction or repellant forces acting on rotor magnets 308a–d may cause rotor 302 to move relative to stator 320.

As noted above, stator 320 may be configured to move rotor 302 and may include electromagnetic coils 322a–b and magnetic permeable elements 324a–b. Stator 320 may also include non-magnetic permeable elements 326a–d. Electromagnetic coils 322a–b may be interspaced with magnetic permeable elements 324a–b and non-magnetic permeable elements 326a–b, respectively. It is contemplated that stator 320 may alternatively include a single electromagnetic coil located on one side of rotor 302. It is also contemplated that magnetic permeable elements 324a–b may be made from a suitable material having high magnetic permeability including, for example, steel 1010 or steel 1018. It is further contemplated that non-magnetic permeable elements 326a–d may be made from a material having low magnetic permeability including, for example, stainless steel 303, stainless steel 316, or aluminum.

First electromagnetic coil 322a may be disposed on first side 304 of rotor 302 and may be configured to be an elongated flat coil. Second electromagnetic coil 322b may be disposed on second side 306 of rotor 302 and may also be configured to be an elongated flat coil. Electromagnetic coils 322a–b may generate electromagnetic fluxes which, in turn, may attract and/or repel rotor magnets 308a–d thereby affecting movement of rotor 302 relative to stator 320.

Magnetic permeable element 324a may be disposed radially inside first electromagnetic coil 322a and magnetic permeable element 324b may be disposed radially inside of electromagnetic coil 322b. Non-magnetic permeable elements 326a–b may be disposed radially outside of first electromagnetic coil 322a on a first and second axial sides 400, 402 thereof and non-magnetic permeable elements 326c–d may be disposed radially outside of second electromagnetic coil 322b on a first and second axial sides 400, 402 thereof. Magnetic permeable elements 324a–b may interact with magnetic fluxes of rotor magnets 308a–d and may attract rotor magnets 308a–d thereby affecting movement of rotor 302 relative to stator 320 when electromagnetic coils 322a–b are de-energized.

Figure 3:
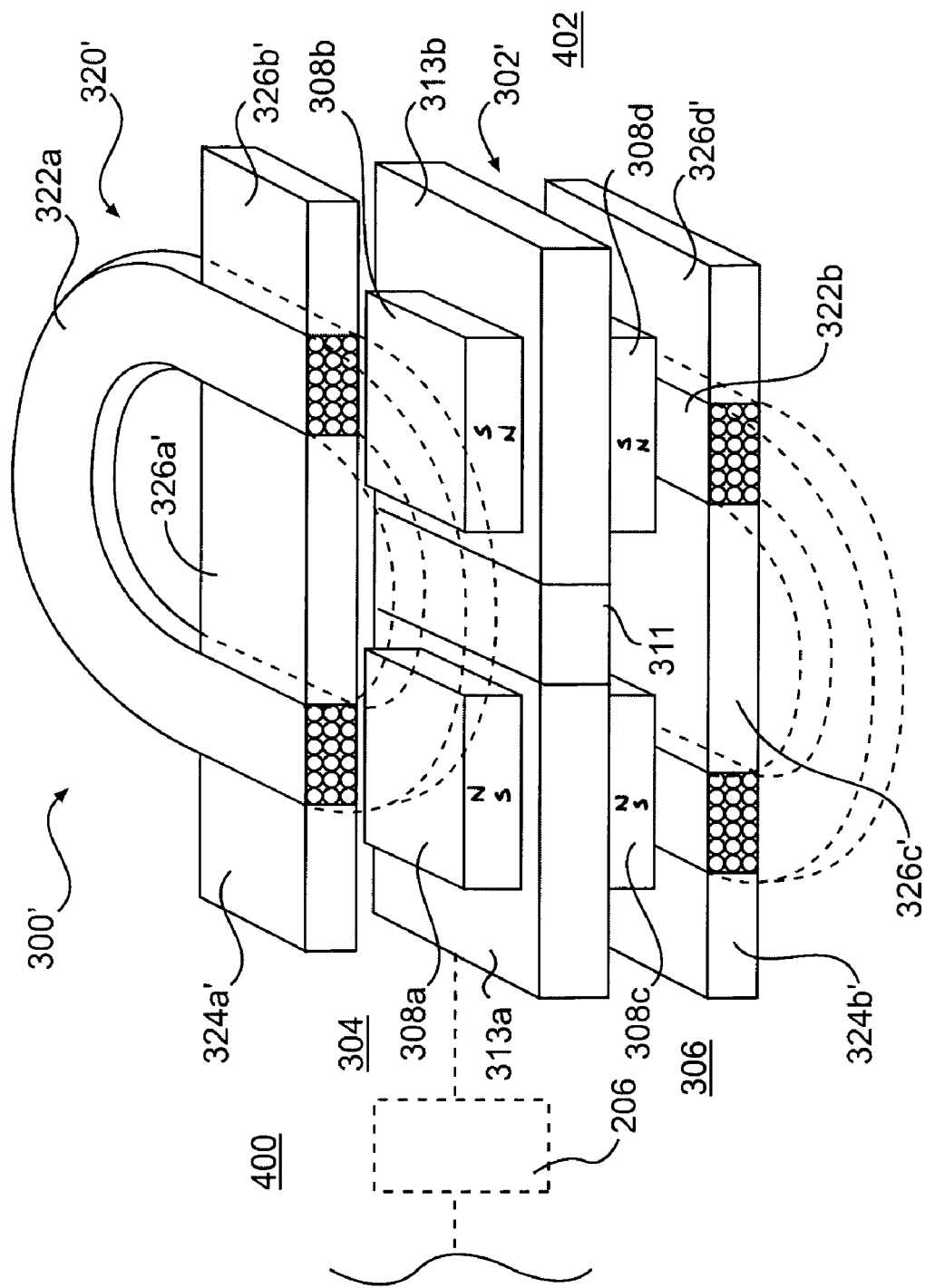
FIG. 3 is another exemplary linear motor for a valve unit of the hydraulic system illustrated in FIG. 1.

FIG. 3 illustrates another exemplary linear motor 300'. Linear motor 300' is similar in structure and operation to linear motor 300 and, as such, only the differences are discussed below. Linear motor 300' may be configured to move valve element 202 and may include a rotor 302' and a stator 320'. Rotor 302' may be elongate in shape and similar to rotor 302 of linear motor 300 and may be connected to valve element 202 via mechanical joint 206. Stator 320' may generate magnetic fluxes to move rotor 302' and to correspondingly move valve element 202 between its first, second, and third positions.

Rotor 302' may be configured to be moved relative to stator 320' and may include rotor magnets 308a–d and a non-magnetic permeable rotor element 311 disposed between two magnetic permeable rotor elements 313a–b. Rotor magnets 308a–d may be disposed on first and second sides 304, 306 of rotor 302' and may be configured to move non-magnetic permeable rotor element 311 and magnetic permeable rotor elements 313a–b when interacting with magnetic fluxes generated by electromagnetic coils 322a–b and/or with magnetic permeable elements 324a'-b'. It is contemplated that non-magnetic permeable element 311 may be made from a material having low magnetic permeability including, for example, stainless steel 303, stainless steel 316, or aluminum. It is further contemplated that magnetic permeable elements 313a–b may be made from a material having high magnetic permeability including, for example, steel 1010 or steel 1018.

Rotor magnets 308a–d may be disposed on rotor 302' and, in particular, may be disposed on magnetic permeable rotor elements 313a–b. Specifically, rotor magnet 308a may be disposed on a first side 304 of magnetic permeable rotor element 313a, rotor magnet 308c may be disposed on a second side 306 of magnetic permeable rotor element 313a, rotor magnet 308b may be disposed on a first side 304 of magnetic permeable rotor element 313b, and rotor magnet 308d may be disposed on a second side 306 of magnetic permeable rotor element 313b. Rotor 302' may interact with stator 320' similar to the interaction of rotor 302 with stator 320, that is, rotor 302' may move relative to stator 320' in response to rotor magnets 308a–d interacting with electromagnetic fluxes and magnetic permeable elements of stator 320'.

Stator 320' may be configured to move rotor 302' and may include two electromagnetic coils 322a–b interspaced with magnetic permeable elements 324a'–b' and non-magnetic permeable elements 326a'–d', respectively. It is contemplated that stator 320' may alternatively include a single electromagnetic coil located on one side of rotor 302. It is also contemplated that magnetic permeable elements 324a'–b' may be made from a suitable material having high magnetic permeability including, for example, steel 1010 or steel 1018. It is further contemplated that non-magnetic permeable elements 326a'–d' may be made from a material having low magnetic permeability including, for example, stainless steel 303, stainless steel 316, or aluminum.

Magnetic permeable elements 324a'–b' may be disposed radially outside of respective first and second electromagnetic coils 322a–b at a first axial side 400 of stator 320'. Non-magnetic permeable elements 326a', 326c' may be disposed radially inside of respective first and second electromagnetic coils 322a–b. Non-magnetic permeable elements 326b', 326d' may be disposed radially outside of first electromagnetic coil 322a on a second axial side 402 of stator 320' opposite the first axial side. Magnetic permeable elements 324a'–b' may interact with magnetic fluxes of rotor magnets 308a–d and may attract rotor magnets 308a–d thereby affecting movement of rotor 302' relative to stator 320' when electromagnetic coils 322a–b are de-energized. It is contemplated that magnetic permeable elements 324a'–b' may be disposed radially outside first and second electromagnetic coils 322a–b on respective second axial sides 402 thereof and non-magnetic permeable elements 326b'–d' may be disposed radially outside first and second electromagnetic coils 322a–b on respective first axial sides 400 thereof, if desired.

Figure 4:
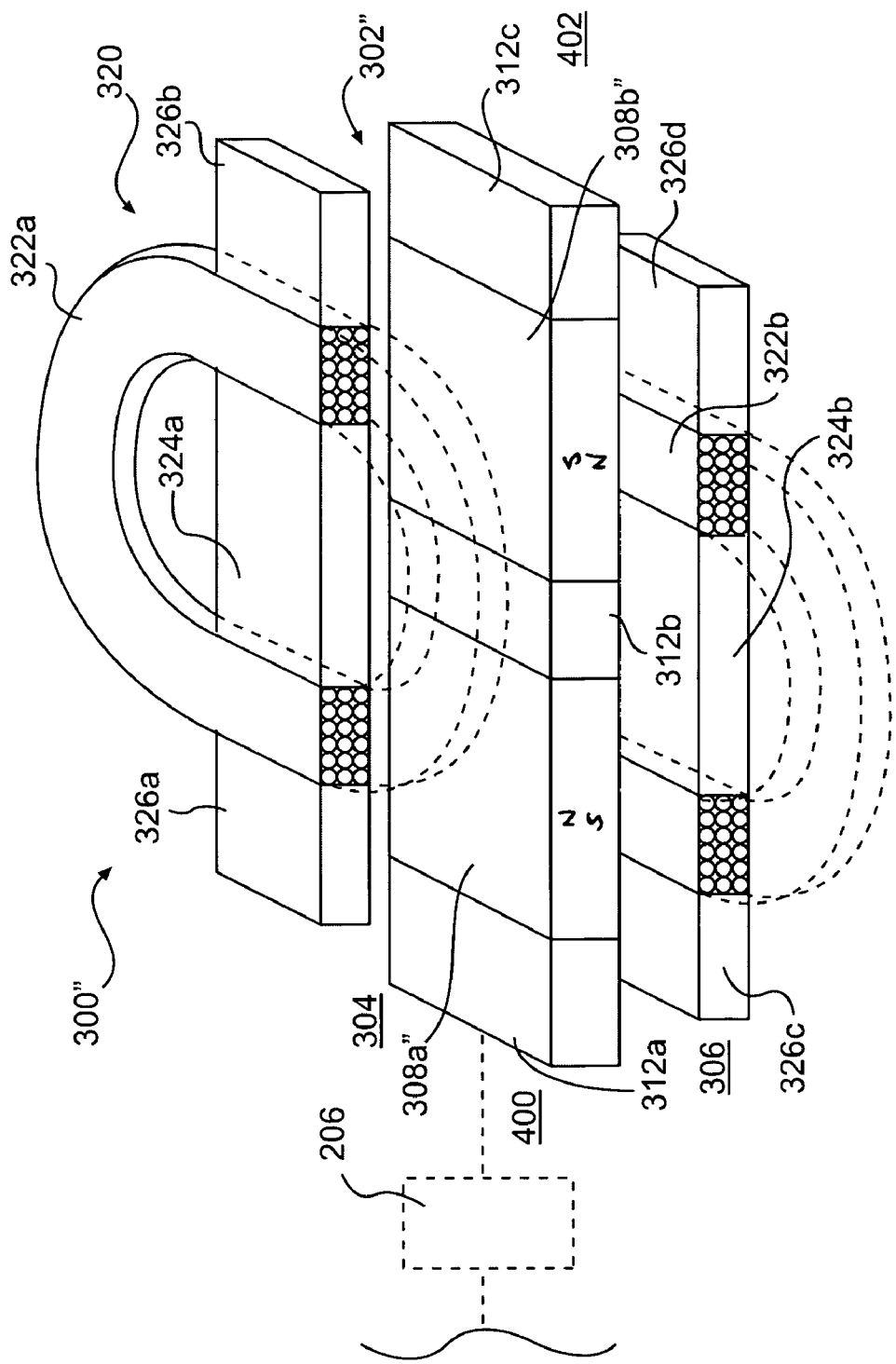
FIG. 4 is another exemplary linear motor for a valve unit of the hydraulic system illustrated in FIG. 1.

FIG. 4 illustrates another exemplary linear motor 300". Linear motor 300" is similar in structure and operation to linear motor 300 and as such only the differences are discussed below. Linear motor 300" may be configured to move valve element 202 and may include a rotor 302" and a stator 320. Rotor 302" may be elongate in shape and similar to rotor 302 of linear motor 300 and may be connected to valve element 202 via mechanical joint 206. Rotor 302", similar to rotor 302 of linear motor 300, may be movable relative to stator 320 in response to magnetic fluxes generated in stator 320 to correspondingly move valve element 202 between the first, second, and third positions.

Rotor 302" may be configured to move relative to stator 320 and may include rotor magnets 308a"–b" interspaced with non-magnetic permeable rotor elements 312a–c. Rotor magnets 308a"–b" may be configured to move when interacting with magnetic fluxes generated by electromagnetic coils 322a–b and/or with magnetic permeable elements 324a–b. Rotor magnets 308a"–b" may be disposed adjacent to rotor elements 312a–c in the longitudinal direction of rotor 302" and may be configured to form an alternating pattern of rotor elements and rotor magnets. Rotor magnets 308a"–b" may constitute any suitable permanent magnet. Rotor 302" may interact with stator 320 similar to that of rotor 302 interacting with stator 320. It is contemplated that non-magnetic permeable rotor elements 312a–c may be made from a material having low magnetic permeability including, for example, stainless steel 303, stainless steel 316, or aluminum.

Control system 100 may be electronically coupled with linear motor 300 and may be configured to control the operation thereof. Control system 100 may include an electronic control module (not shown) having a microprocessor (not shown) and/or a memory (not shown). As is known in the art, the memory may be connected to the microprocessor and may be configured to store, for example, instructions and/or variables. Control system 100 may be electrically connected to current source 38 via any one of various known electric circuits such as, for example, power supply circuitry, signal conditioning circuitry, or any other circuitry known in the art. Control system 100 may also include an operator interface (not shown) such as, for example, a lever, button, knob, or any other operator interface known in the art. An operator input via the operator interface may selectively actuate linear motor 300 and, in turn, affect the flow of pressurized fluid within hydraulic system 10. It is further contemplated that control system 100 may include various other components such as, for example, amplifiers, filters, sensors, and any other electrical components known in the art.

INDUSTRIAL APPLICABILITY

The disclosed linear motor 300 may be applicable to rectilinearly move any reciprocating component and, in particular, rectilinearly move valve element 202. Linear motor 300 may provide efficient movement of valve element 202 with a magnetically biased neutral position. Additionally, the linear motor may reduce the occurrence of hydraulic system malfunctions and/or contamination by providing a simple direct drive valve unit capable of operating in high fluid flow hydraulic systems. The operation of linear motor 300 is explained below.

Magnetic fluxes may include permanent magnetic fluxes and/or electromagnetic fluxes. A permanent magnet flux having north and south polarity may be generated by the north and south poles of a permanent magnet. An electromagnetic flux may be generated when current flows through an electromagnetic coil and, similar to a permanent magnet, may have north and south polarity. The polarity of an electromagnetic flux may depend upon the direction of current within an electromagnetic coil. Specifically, a current in a first direction within an electromagnetic coil may produce an electromagnetic flux having a first polarity and a current in a second direction, opposite the first direction, may produce an electromagnetic flux having a second polarity, opposite the first polarity.

Magnetic fluxes interacting with high magnetic permeable materials may attract the high magnetic permeable materials toward the source of the magnetic flux and/or attract the source of the magnetic flux toward the high magnetic permeable material. That is, if the source of the magnetic flux is fixed and the high magnetic permeable material is free to move, the resulting interaction will tend to move the high magnetic permeable material toward the source of the magnetic flux. Conversely, if the source of the magnetic flux is free to move and the high magnetic permeable material is fixed, the resulting interaction will tend to move the source of the magnetic flux toward the high magnetic permeable material.

Additionally, interacting magnetic fluxes may attract or repel one another depending upon the polarity of the respective fluxes. Interacting magnetic fluxes may force and move the respectively associated sources of magnetic flux relative to one another and toward a position of minimum magnetic reluctance. Minimum magnetic reluctance may be a position where the interacting magnetic forces are minimized and/or a position where respective sources of magnetic flux are restrained from further movement. Magnetic fluxes interacting with high magnetic permeable materials and/or interacting with other magnetic fluxes may move elements associatively connected therewith dependent upon the magnitude of the magnetic flux and the resistive forces prohibiting movement of the associated elements.

Referring to FIG. 2, rotor 302 may be movable in response to current supplied through electromagnetic coils 322a–b. Electromagnetic coils 322a–b may be de-energized and generate substantially no electromagnetic flux when a substantially zero current flows therethrough. When electromagnetic coils 322a–b are de-energized, rotor 302 may be magnetically biased to a neutral position. Electromagnetic coils 322a–b may be energized and generate an electromagnetic flux when a current flows therethrough. When electromagnetic coils 322a–b are energized, rotor 302 may be magnetically biased by the generated electromagnetic flux to move toward the forward stroke or toward the rearward stroke relative to stator 320.

For example, when electromagnetic coils 322a–b are de-energized, rotor magnets 308a–d may magnetically bias rotor 302 to a center position substantially equidistantly spaced relative to first and second axial sides 400, 402 of stator 320. Specifically, the magnetic fluxes of rotor magnets 308a–d may interact with magnetic permeable elements 324a–b and may be attracted thereto. Rotor magnets 308a, 308c may be attracted to magnetic permeable elements 324a–b, respectively, and may bias rotor 302 toward second axial side 402 of stator 320. Rotor magnets 308b, 308d may also be attracted to magnetic permeable elements 324a–b, respectively, and may bias rotor 302 toward first axial side 400 of stator 320. Because rotor magnets 308a, 308c bias rotor 302 toward second axial side 402 and rotor magnets 308b, 308d bias rotor 302 toward first axial side 400, rotor 302 may establish minimum magnetic reluctance centered around magnetic permeable elements 324a–b. That is, the magnetic forces biasing rotor 302 toward first axial side 400 and the magnetic forces biasing rotor 302 toward second axial side 402 may substantially balance when rotor magnets 308a, 308c are substantially equidistant from magnetic permeable elements 324a–b as rotor magnets 308b, 308d. As such, rotor 302 may be magnetically biased in a central neutral position relative to stator 320 (as shown in FIG. 2).

When electromagnetic coils 322a–b are energized, the generated electromagnetic flux may interact with the permanent magnetic flux of rotor magnets 308a–d to magnetically bias rotor 302 toward a forward and/or a rearward stroke position. Specifically, current supplied to electromagnetic coils 322a–b in a first direction may cause rotor 302 to move toward first axial side 400 correspondingly moving valve element to the first position to fluidly communicate source 14 and first chamber 19. Additionally current supplied to electromagnetic coils 322a–b in a second direction, opposite the first direction may cause rotor 302 to move toward second axial side 402 correspondingly moving valve element 202 (referring to FIG. 1) to a second position fluidly communicating source 14 with second chamber 21. The amount of current supplied to electromagnetic coils 322a–b from current source 38 is directly proportional to the resulting electromagnetic force. Specifically, the greater the magnitude of current within electromagnetic coils 322a–b the greater the magnitude of the generated electromagnetic flux and the greater the magnitude of actuation force to move valve element 202.

Because rotor 302 may be solely magnetically biased to a neutral position when electromagnetic coils 322a–b are de-energized, springs may not be necessary to bias rotor 302 to a neutral position. Accordingly, linear motor 300 may reduce overall valve unit failure and may improve the reliability and operation of hydraulic system 10. Springs may be susceptible to wear, fatigue, and failure which may adversely affect the reliability and operation of a valve unit. Additionally, because rotor 302 may be solely magnetically biased and does not overcome a spring bias, valve element actuation may be more efficient and may provide a less complex direct drive valve.

Additionally, because rotor 302 may be elongate in shape and because stator 320 may be substantially planar, linear motor 300 may provide a compact and planar actuator for moving valve element 202. As the restrictive forces on valve element 202 increase, the required electromagnetic force required to move valve element 202 proportionally increases. As noted above, greater electromagnetic forces may be generated by increasing the amount of current through electromagnetic coils, which may require a relatively large electromagnetic coil. The size of a conventional electromagnetic coil that surrounds a cylindrical armature and provides the required electromagnetic force, may produce a linear motor that exceeds the available space limitations commonly associated with valve environments, such as, for example, stacked valve sets and/or rectilinear space constraints. Because linear motor 300 may be compact and, in particular, because stator 320 may be substantially planar, linear motor 300 may be able to actuate valve elements having high restrictive forces thereon, such as, for example, high flow rate valves, within available space limitations.

The operation of linear motor 300' (referring to FIG. 3) is substantially similar to the operation of linear motor 300 as explained above and as such only the differences are explained below. When electromagnetic coils 322a–b are de-energized, rotor magnets 308a–d may magnetically bias rotor 302' to an axial end position relative to stator 320'. Specifically, the magnetic fluxes of rotor magnets 308a–d may interact with magnetic permeable elements 324a'–b' and may be attracted thereto. Rotor magnets 308a, 308c may be attracted to magnetic permeable elements 324a'–b', respectively, and may bias rotor 302 toward first axial side 400. Rotor magnets 308b, 308d may also be attracted to magnetic permeable elements 324a'–b', respectively, and may also bias rotor 302 toward first axial side 400. Because rotor magnets 308a–d force rotor 302 toward first axial side 400, rotor 302 may establish minimum magnetic reluctance toward first axial side 400 adjacent magnetic permeable elements 324a'–b'. It is contemplated that magnetic permeable elements 324a'–b' may be located on second axial side 402 and, as such, rotor 302 may establish magnetic force equilibrium toward second axial side 402. Accordingly, rotor 302 may be magnetically biased toward either one of axial sides 400, 402 depending on the location of magnetic permeable elements 324a'–b'.

Additionally, non-magnetic permeable rotor element 311 may restrict the flow of the permanent magnetic flux of rotor magnets 308a–d of rotor 302' and the flow of the electromagnetic flux generated by electromagnetic coils 322a–b of stator 320'. Magnetic fluxes may surround their source and may be affected by the elements located within the magnetic flux. Specifically, magnetic fluxes may tend to flow toward and/or through high magnetic permeable materials and may tend to resist flowing toward and/or through low magnetic permeable materials. Accordingly, non-magnetic permeable rotor element 311 may resist the flow of the permanent magnetic flux of rotor magnets 308a–d of rotor 302' and the flow of the electromagnetic flux generated by electromagnetic coils 322a–b. As such, the amount of magnetic flux that may flow along the longitudinal direction of rotor 302' may be reduced thereby increasing the amount of magnetic flux that may flow between rotor 302' and stator 320'. A greater amount of interacting magnetic flux may increase the resultant magnetic force. As a result, the interacting magnetic biasing forces of linear motor 300' may produce a larger magnitude force than interacting magnetic biasing forces of linear motor 300 for substantially the same current supplied to respective stators 320, 320'.

The benefits of linear motor 300' are similar to those of linear motor 300, specifically, because rotor 302' may be solely magnetically biased, the adverse effects of spring-biased linear motors may be overcome. Additionally, because non-magnetic permeable rotor element 311 may resist the flow magnetic fluxes of rotor 302' and stator 320' and magnetic permeable rotor elements 313a–b permit the flow of magnetic fluxes of rotor 302' and stator 320', the magnetic flux of rotor magnets 308a–d may have a greater interaction with the magnetic flux of electromagnetic coils 322a–b. As a result, linear motor 300' may produce a greater linear actuation force than that generated in linear motor 300 for an equal amount of current respectively supplied thereto because linear motor 300' may produce a greater interaction of magnetic fluxes between rotor 302' and stator 320' than that of linear motor 300.

The operation of linear motor 300" (referring to FIG. 4) is similar to that of linear motor 300 and 300' as explained above and as such only the differences are explained below. Similar to linear motor 300, when electromagnetic coils 322a–b are de-energized, rotor magnets 308a"–b" may magnetically bias rotor 302" to a center position substantially equidistantly spaced relative to first and second axial sides 400, 402 of stator 320. Specifically, the magnetic fluxes of rotor magnets 308a"–b" may interact with magnetic permeable elements 324a–b and may be attracted thereto. Rotor magnet 308a" may be attracted to magnetic permeable elements 324a–b and may bias rotor 302" toward second axial side 402 of stator 320. Similarly, rotor magnet 308b" may be attracted to magnetic permeable elements 324a–b and may bias rotor 302" toward first axial side 400 of stator 320. Additionally, similar to linear motor 300', and particularly non-magnetic permeable rotor element 311 (see FIG. 3), non-magnetic permeable element 312b may resist the flow of the permanent magnet flux of rotor magnets 308a"–b" along rotor 302" and the electromagnetic flux generated by electromagnetic coils 322a–b of stator 320.

The benefits of linear motor 300" are similar to those of linear motor 300', specifically, because rotor 302" may be solely magnetically biased, the adverse effects of spring-biased linear motors may be overcome. Additionally, because non-magnetic permeable element 312b may resist the flow of magnetic fluxes of rotor 302" and stator 320 from along rotor 302", the magnetic flux of rotor magnets 308a"–b" may have a greater interaction with the magnetic flux of electromagnetic coils 322a–b. As a result, linear motor 300" may produce a greater linear actuation force than that generated in linear motor 300 for an equal amount of current respectively supplied thereto. Furthermore, because rotor magnets 308a"–b" may be disposed within rotor 302", as opposed to rotor magnets 308a–d which may be disposed on rotor 302 as in linear motor 300 (see FIG. 2), linear motor 300" may provide a compact linear motor design by reducing the transverse thickness of rotor 302".

It will be apparent to those skilled in the art that various modifications and variations can be made to the disclosed linear motor and direct drive valve system. Other embodiments will be apparent to those skilled in the art from consideration of the specification and practice of the disclosed linear motor and direct drive valve system. It is intended that the specification and examples be considered as exemplary only, with a true scope being indicated by the following claims and their equivalents.

What is claimed is:

1. A linear motor, comprising:
 a stator including at least one electromagnetic coil and at least one magnetically permeable element disposed either radially inward or radially outward of the at least one electromagnetic coil; and
 a rotor having at least one permanent magnet and being movable toward at least a first position when the at least one electromagnetic coil is energized; and solely magnetically biased toward a neutral position when the at least one electromagnetic coil is de-energized the neutral position being a function of a position of the at least on magnetically permeable element.

2. The linear motor of claim 1, wherein the rotor is movable toward at least a second position opposite the first position and the neutral position is disposed between the first and second positions.

3. The linear motor of claim 1, wherein the rotor is movable toward at least a second position opposite the first position and the neutral position is substantially adjacent the second position.

4. The linear motor of claim 1, wherein the at least one magnetically permeable element is configured to magnetically bias the rotor when the at least one electromagnetic coil is de-energized.

5. The linear motor of claim 1, wherein the at least one magnetically permeable element is disposed radially inward of the at least one electromagnetic coil.

6. The linear motor of claim 1, wherein the at least one magnetically permeable element is disposed radially outward of the at least one electromagnetic coil.

7. The linear motor of claim 1, wherein the stator includes at least two electromagnetic coils, one of the at least two electromagnetic coils being disposed on a first side of the rotor and the other of the at least two electromagnetic coils being disposed on a second side of the rotor opposite the first side.

8. The linear motor of claim 1, wherein the rotor is configured to be elongate in shape and the at least one electromagnetic coil is configured to be substantially planar in shape and disposed adjacent the rotor.

9. The linear motor of claim 1, wherein a magnetic flux required to move the rotor toward the first position is substantially equal to a magnetic flux required to move the rotor toward a second position opposite the first position.

10. The linear motor of claim 1, wherein the at least one permanent magnet includes a first and second permanent magnet and the rotor further includes at least one non-magnetically permeable element disposed between the first and second permanent magnets.

11. A valve unit, comprising:
the linear motor of claim 1; and
a valve having a valve element connected to the rotor and disposed within a valve housing, the valve element movable toward a first valve position when the at least one electromagnetic coil is energized and movable toward a second valve position when the at least one electromagnetic coils is de-energized.

12. The valve unit of claim 11, wherein the stator is configured to be fixed relative to the valve body.

13. The valve unit of claim 11, wherein the valve is configured to control the flow of pressurized working fluid to a hydraulic cylinder of a work machine.

14. A method of operating a linear motor having a rotor with at least one permanent magnet and a stator with at least one electromagnetic coil, and at least one permanent magnet and a stator with at least one electromagnetic coil the method comprising:
selectively energizing the at least one electromagnetic coil to selectively move the rotor between a first position and a second position opposite the first position;
de-energizing the at least one electromagnetic coil; and
solely magnetically biasing the rotor toward a neutral position.

15. The method of claim 14,
wherein solely magnetically biasing the rotor toward a neutral position includes biasing the rotor to a position between the first and second positions.

16. The method of claim 14,
wherein solely magnetically biasing the rotor toward a neutral position includes biasing the rotor to a position substantially adjacent the second position.

17. The method of claim 14, wherein solely magnetically biasing includes interacting at least one magnetically permeable element with the at least one permanent magnet of the rotor.

18. The method of claim 14, wherein energizing the at least one electromagnetic coil includes energizing a first electromagnetic coil disposed on a first side of the rotor and energizing a second electromagnetic coil disposed on a second side of the rotor opposite the first side.

19. The method of claim 14, wherein the rotor is configured to be elongate in shape and the at least one electromagnetic coil is configured to be substantially planar and disposed adjacent the rotor.

20. The method of claim 14, wherein a magnetic flux required to move the rotor toward the first position is substantially equal to a magnetic flux required to move the rotor toward a second position opposite the first position.

21. A method of moving a valve element comprising:
selectively energizing at least one electromagnetic coil to selectively move the valve element between a first position and a second position;
de-energizing the at least one electromagnetic coil; and
solely magnetically biasing the valve element toward a neutral position the neutral position being a function of a position of a magnetically permeable element.

22. The method of claim 21,
wherein solely magnetically biasing the valve element toward a neutral position includes biasing the valve element to a position between the first and second positions.

23. The method of claim 21,
wherein solely magnetically biasing the valve element toward a neutral position includes biasing the valve element to a position substantially adjacent the second position.

24. The method of claim 21, wherein at least one magnetically permeable element is configured to interact with the at least one permanent magnet of the rotor to bias the rotor to the neutral position.

25. A hydraulic system comprising:
a source of pressurized fluid;
a fluid actuator;
at least one fluid passageway fluidly communicating the source with the fluid actuator;
a valve disposed within the at least one fluid passageway and configured to selectively affect a flow of pressurized fluid in the at least one fluid passageway, the valve having:
a valve housing, and
a valve element disposed in and configured to be movable relative to the valve housing; and
a linear motor configured to affect movement of the valve element, the linear motor having:
a rotor connected to the valve element having at least one permanent magnet and being movable toward at least a first position when the at least one electromagnetic coil is energized and solely magnetically biased toward a neutral position when the at least one electromagnetic coil de-energized, and
a stator including at least two electromagnetic coils, one of the at least two electromagnetic coils being disposed on a first side of the rotor and the other of the at least two electromagnetic coils being disposed on a second side of the rotor opposite the first side.

26. The hydraulic system of claim 25, wherein the stator is fixed relative to the valve body.

27. The hydraulic system of claim 25, wherein the rotor is movable toward at least a second position opposite the first position and the neutral position is disposed between the first and second positions.

28. The hydraulic system of claim 25, wherein the rotor is movable toward at least a second position opposite the first position and the neutral position is substantially adjacent the first position.

29. The hydraulic system of claim 25, wherein the stator further includes at least magnetically permeable element to magnetically bias the rotor toward the neutral position.

30. The hydraulic system of claim 29, wherein the at least one magnetically permeable element is disposed radially inward of the at least one electromagnetic coil.

31. The hydraulic system of claim 29 wherein the at least one magnetically permeable element is disposed radially outward of the at least one electromagnetic coil.

32. The hydraulic system of claim 25, wherein the rotor is configured to be elongate in shape and the at least one electromagnetic coil is configured to be substantially planar in shape and disposed adjacent the rotor.

33. The hydraulic system of claim 25, wherein the at least one permanent magnet includes at least a first and a second permanent magnet and the rotor further includes at least one non-magnetically permeable element disposed between the first and second permanent magnets.

* * * * *